(12) United States Patent
Dudar

(10) Patent No.: US 10,094,304 B1
(45) Date of Patent: Oct. 9, 2018

(54) SYSTEM AND METHOD FOR DIAGNOSING A VARIABLE DISPLACEMENT ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/608,806

(22) Filed: May 30, 2017

(51) Int. Cl.
    F02D 17/02 (2006.01)
    F02D 13/02 (2006.01)
    F02N 11/08 (2006.01)
    F02D 41/00 (2006.01)

(52) U.S. Cl.
    CPC ......... *F02D 17/02* (2013.01); *F02D 13/0203* (2013.01); *F02D 41/0087* (2013.01); *F02N 11/0818* (2013.01)

(58) Field of Classification Search
    CPC ...... F02D 17/02; F02D 17/04; F02D 13/0203; F02D 41/0087; F02N 11/0818
    See application file for complete search history.

(56) References Cited

U.S. PATENT DOCUMENTS

| 6,701,282 B2 | 3/2004 | Ting et al. |
| 9,378,594 B2 | 6/2016 | Wong et al. |
| 2017/0137022 A1 | 5/2017 | Dudar |

OTHER PUBLICATIONS

Dudar, A. "Systems and Methods for Indicating Canister Purge Valve Degradation," U.S. Appl. No. 15/202,288, filed Jul. 5, 2016, 76 pages.
Dudar, A. "Systems and Methods for a Variable Displacement Engine," U.S. Appl. No. 15/468,013, filed Mar. 23, 2017, 74 pages.

*Primary Examiner* — Jacob Amick
(74) *Attorney, Agent, or Firm* — Julia Voutyras; McCoy Russell LLP (57) ABSTRACT

Systems and methods for determining operation of a cylinder deactivating/reactivating device are disclosed. In one example, a direction of engine rotation is selected to maximize air flow through the engine while the engine is rotated without combusting air and fuel. Operation of one or more cylinder valve deactivating mechanisms is assessed while the engine is rotated without combusting air and fuel.

20 Claims, 7 Drawing Sheets

SYSTEM AND METHOD FOR DIAGNOSING A VARIABLE DISPLACEMENT ENGINE

BACKGROUND AND SUMMARY

Cylinders of an engine may be selectively deactivated to conserve fuel while other cylinders continue to operate to propel a vehicle and to keep the engine rotating. The cylinders may be deactivated by holding intake and exhaust valves of deactivated cylinders in a closed state over an entire engine cycle (e.g., two revolutions for a four stroke engine). Efficiency of cylinders that remain activated increases by improving thermal efficiency and reducing engine pumping losses. Selected cylinders may be deactivated and reactivated responsive to driver demand torque and other vehicle operating conditions. For example, at low engine loads, an eight cylinder engine may combust air and fuel in four cylinders. On the other hand, the same eight cylinder engine may combust air and fuel in all eight cylinders during high driver demand conditions. In this way, the engine may enter and exit cylinder deactivation modes to accommodate different driving conditions.

Over time and varying vehicle operating conditions, the possibility of degradation of one or more valve actuators that selectively activate and deactivate engine cylinders may increase. Therefore, it may be desirable to determine whether or not engine valve actuators are operating as desired. However, it may be difficult to determine whether or not valve actuators are deactivating valves as desired while the engine is operating without disturbing passengers of a vehicle that includes the engine. Further, a signal to noise ratio for determining cylinder valve actuator degradation may be low while the engine is operating because exhaust gas recirculation (EGR), barometric pressure, and other engine operating conditions may affect the signal to noise ratio of signals used to determine valve actuator degradation.

The inventor herein has recognized that an engine's valves may not activate and deactivate as desired from time to time and has developed an engine operating method, comprising: rotating an engine without combusting air and fuel in a direction reversed from a direction the engine rotates while combusting air and fuel via a controller; and adjusting operation of the engine in response to engine air flow less than a first threshold or greater than a second threshold while deactivating valves of one or more engine cylinders.

By rotating an engine in a reverse direction and measuring engine air flow while the engine is rotating, it may be possible to provide the technical result of determining whether or not one or more cylinder valve actuator mechanisms is degraded. In particular, rotating an engine in a reverse direction while engine cylinders are not combusting air and fuel may provide an increased amount of air flow through the engine as compared to if the engine were rotated in a forward direction because of intake and exhaust valve timing. The increased air flow may provide an improved signal to noise ratio so that valve actuator diagnostics may be improved. Further, a higher air flow rate through the engine may allow the engine to be rotated at a lower speed while still being able to detect cylinder valve actuator degradation reliably.

The present description may provide several advantages. In particular, the approach may provide improved diagnostics of engine cylinder valve deactivation devices. Additionally, the approach may allow the engine to rotate at lower speeds when diagnostics are performed so that the diagnostics may be less noticeable. Further, the approach may conserve battery power by performing diagnostics at lower engine speeds when the engine is not combusting air and fuel and is rotated via an electric machine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
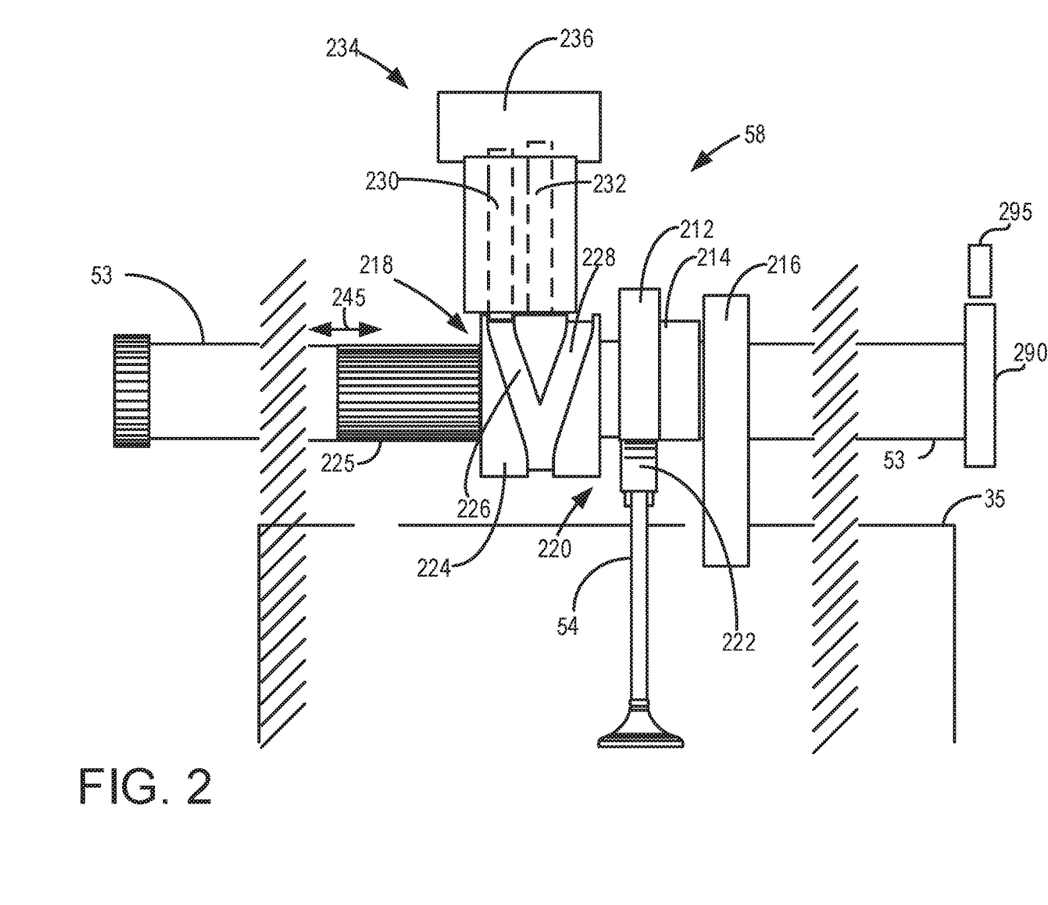
FIG. 2 shows an example cylinder valve activating/deactivating device.
Figure 3A:
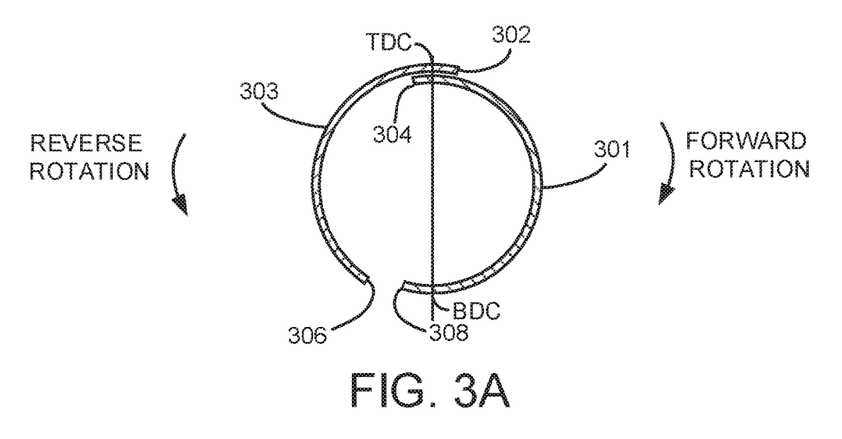
FIGS. 3A and 3B show example cylinder valve opening timings.
Figure 3B:
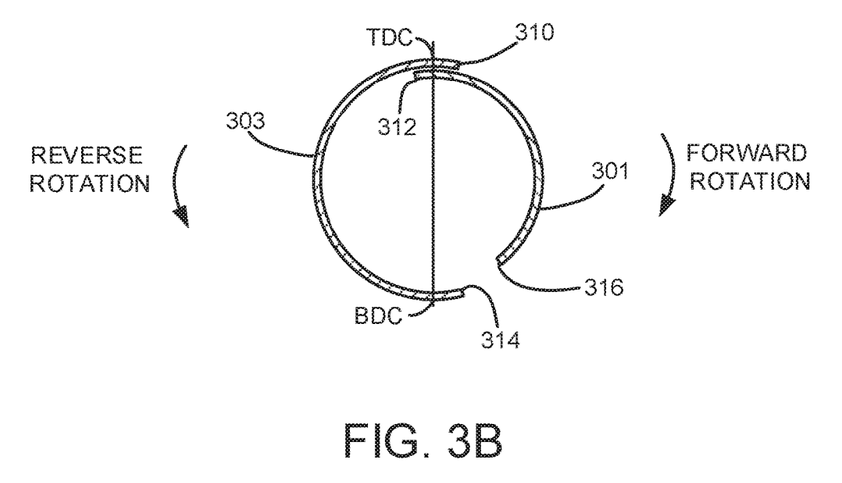
Figure 4A:
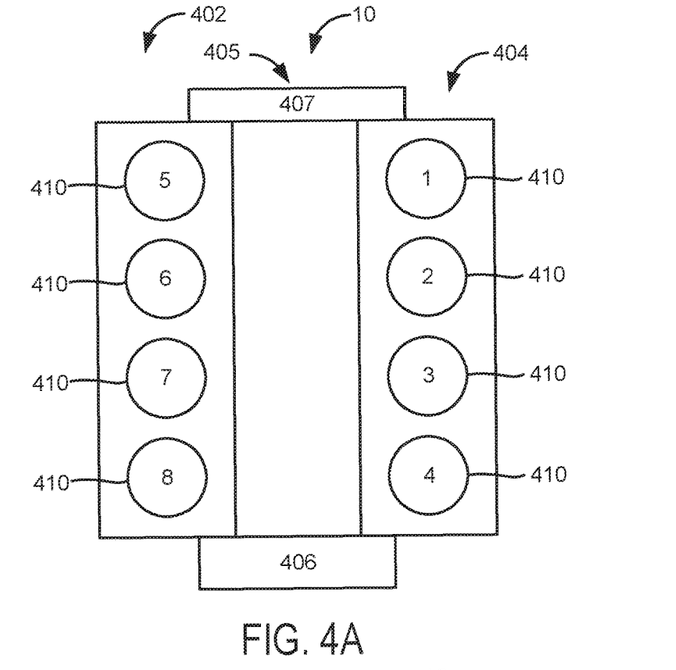
FIGS. 4A and 4B show example cylinder configurations.
Figure 4B:
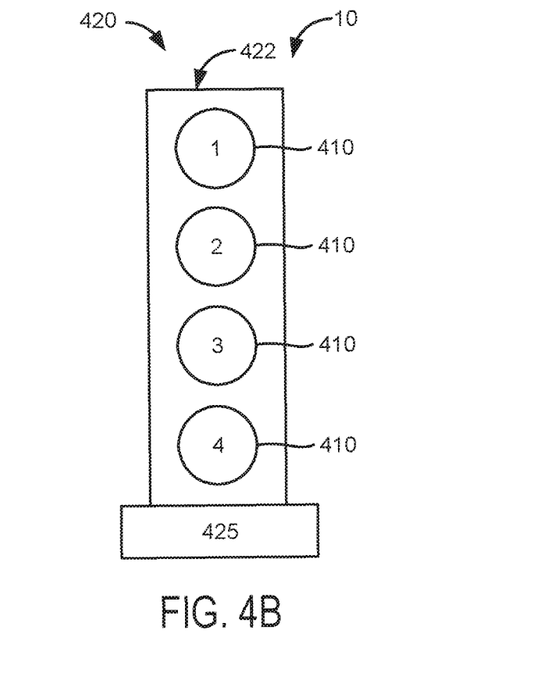
Figure 5:
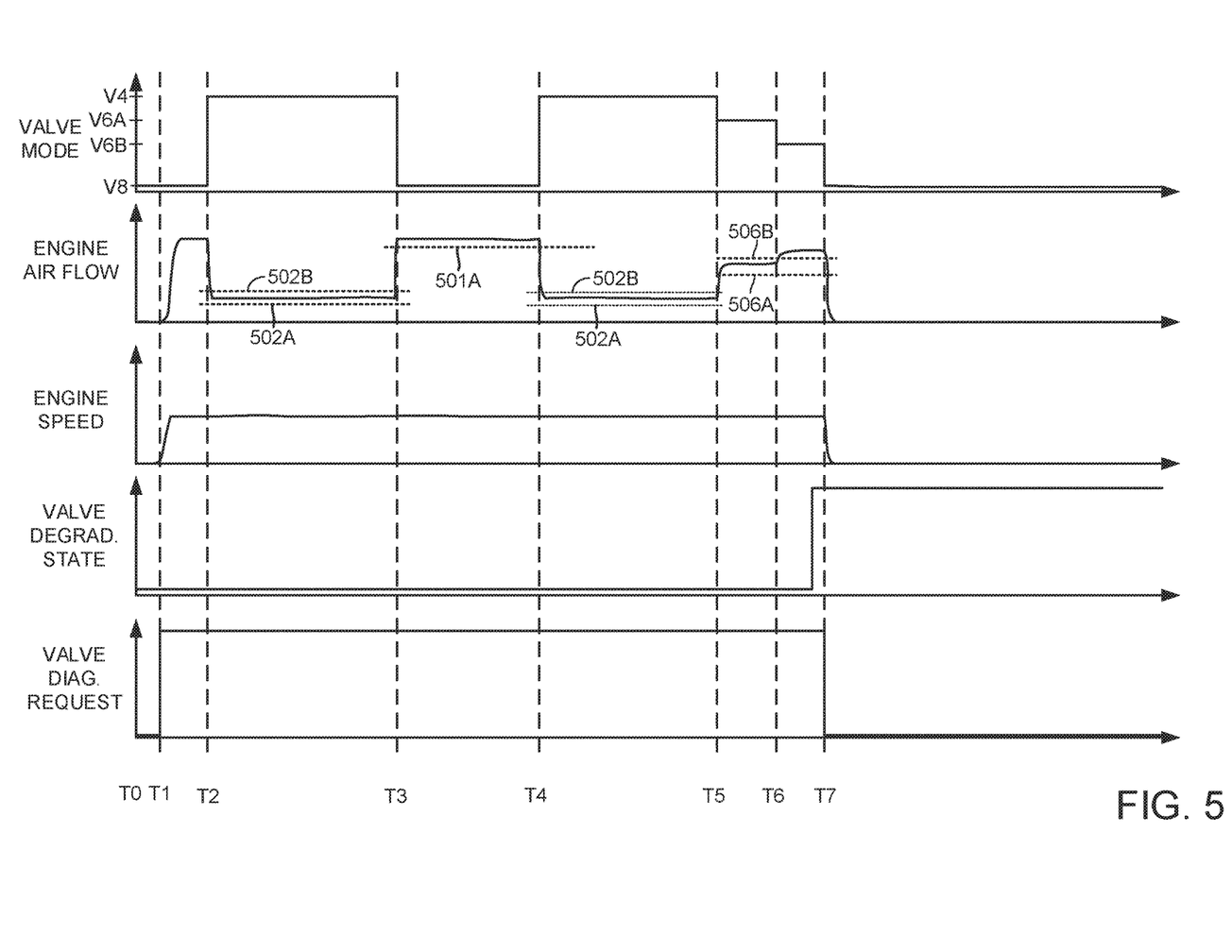
FIG. 5 shows an example cylinder valve deactivation mechanism diagnostic.

The present description is related to providing diagnosing operation of an engine that includes actuating mechanisms for cylinder valves. The actuating mechanisms may be included in the engine to selectively deactivate intake and exhaust valves of engine cylinders to activate and deactivate engine cylinder modes. An example actuating mechanism for cylinder valves is shown in FIG. 2. Example valve timings are shown in FIGS. 3A-3B while example engine cylinder configurations are shown in FIGS. 4A and 4B. A sequence for determining the presence or absence of valve actuator degradation is shown in FIG. 5. The method of FIGS. 6A and 6B diagnoses the presence or absence of valve actuator degradation.

Figure 1:
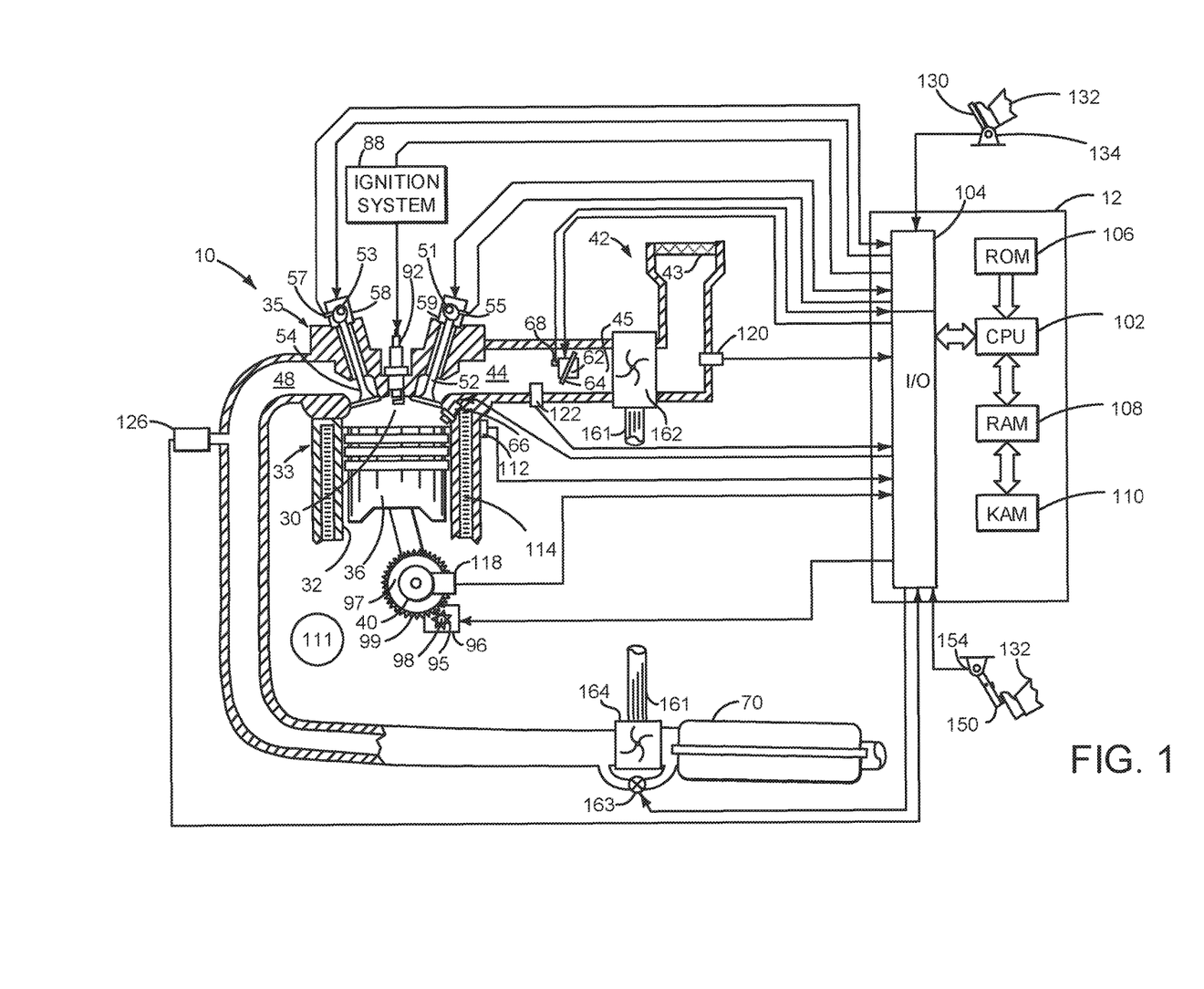
FIG. 1 shows a schematic diagram of one cylinder of an example engine system.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 may rotate in a forward direction (e.g., clockwise) or in a reverse direction (e.g., counter clockwise) via being supplied electrical power by an H bridge circuit (not shown). In other examples, integrated starter/generator (ISG) 111 may rotate engine and ISG 111 may be directly coupled to crankshaft 40 or coupled to crankshaft 40 via a belt.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58. Valve actuator devices 58 and 59 may be as shown in FIG. 2 or other known configurations.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42. Throttle 62 is positioned downstream of compressor 162 in the direction of air flow into engine 10.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows an example cylinder valve actuator 58 for application in engine 10 shown in FIG. 1. Cylinder valve actuator 58 adjusts a lift and/or valve opening duration of a cylinder exhaust valve 54 in response to engine operating conditions. Cylinder valve actuator 58 may provide zero valve lift for one or more engine cycles to deactivate cylinder exhaust valves 54. Exhaust camshaft 53 is shown positioned above a cylinder head 35 of an engine cylinder bank. Exhaust valve 54 is configured to open and close an exhaust port in a cylinder, such as the cylinder shown in FIG. 1. For example, exhaust valve 54 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. Further, a cylinder valve actuator similar to cylinder valve actuator 58 may be applied to engine intake valves. In addition, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 35 to support exhaust camshaft 53. For example, cam tower 216 is shown coupled to cylinder head 35 adjacent to exhaust valve 54. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 54 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 54, may be operated in different lift modes based on engine operating conditions.

Exhaust camshaft 53 may include a plurality of cams configured to control the opening and closing of the exhaust valves. For example, FIG. 2 shows a first cam lobe 212 and a second cam lobe 214 positioned above valve 54. The cams lobes may have different shapes and sizes to form lift profiles used to adjust an amount and timing of a lifting of valve 54 while exhaust camshaft 53 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 53 includes a mechanism 218 coupled to the camshaft above the exhaust valve 54 for adjusting an amount of valve lift for that exhaust valve 54 and/or for deactivating that exhaust valve by changing a location of cam lobes along the camshaft relative to exhaust valve 54. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 54, may be slid across the camshaft in directions indicated by arrow 245 to change a cam lobe profile coupled to the valve follower, e.g., follower 220 coupled to exhaust valve 54, to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to exhaust camshaft 53. Camshaft position relative to the engine crankshaft is determined via rotation sensing camshaft position sensor 295 and exhaust camshaft position indicator 290. Exhaust camshaft 53 may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to exhaust valve 54 in order to change the lift of the exhaust valve 54. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 54. Sleeve 224 is shown in a first position while pin 232 shifts sleeve 224 to the left side of FIG. 2. Sleeve 224 follows spline 225 in an axial direction along exhaust camshaft 53 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 53 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to exhaust camshaft 53. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Exhaust cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Thus, the system of FIGS. 1 and 2 provides for an engine system, comprising: an engine including one or more cylinder valve actuators; an electric machine; and a controller including executable instructions stored in non-transitory memory to rotate the engine clockwise and counter clockwise, the engine rotated clockwise when the engine combusts air and fuel, the engine rotating counter clockwise when the engine is not combusting air and fuel and while one or more of the cylinder valve actuators are deactivating one or more cylinder valves. The engine system includes where the electric machine is a starter motor. The engine system includes where the electric machine is an integrated starter/generator. The engine system further comprises additional instructions to determine air flow through the engine via an air flow meter while the engine is rotating counter clockwise. The engine system further comprising additional instructions to deactivate one or more cylinder modes in response to output of the air flow meter. The engine system includes where deactivating one or more cylinder valves comprises holding one or more cylinder valves in a closed state for at least two consecutive engine revolutions.

Referring now to FIG. 3A, example valve timings for rotating an engine in a forward direction (e.g., clockwise) when diagnosing cylinder valve actuators is shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 302. The exhaust valve opening (EVO) time when the engine is rotated in a forward direction is at 306. The intake valve closing (IVC) time when the engine is rotated in a forward direction is at 308. The intake valve opening (IVO) time when the engine is rotated in a forward direction is at 304. If the engine is rotated in a reverse direction, EVO occurs at 302 and EVC occurs at 306. IVO occurs at 308 and IVC occurs at 304.

Thus, it may be observed that the intake valve opening duration is longer than the exhaust valve opening duration. Further, IVO is near TDC and IVC is near BDC for rotating the engine in a forward direction. EVO is after BDC and EVC is after TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. Therefore, air flow through the engine when the engine is rotated with an open intake throttle and unfueled in a forward direction is greater than air flow through the engine when the engine is rotated with the intake throttle open and unfueled in a reverse direction at a same engine speed. The increased air flow through the engine while the engine is rotated at a first speed in a forward direction is due to the longer intake valve opening duration and intake valve opening and closing timings. The decreased air flow through the engine while the engine is rotated at the first speed in a reverse direction is due to the shorter exhaust valve opening duration and exhaust valve opening and closing timings as compared to the intake valve opening duration and the intake valve opening and closing times.

Referring now to FIG. 3B, example valve timings for rotating an engine in a reverse direction (e.g., counter clockwise) when diagnosing cylinder valve actuators is shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 310. The exhaust valve opening (EVO) time when the engine is rotated in a forward direction is at 314. The intake valve closing (IVC) time when the engine is rotated in a forward direction is at 316. The intake valve opening (IVO) time when the engine is rotated in a forward direction is at 312. If the engine is rotated in a reverse direction, EVO occurs at 310 and EVC occurs at 314. IVO occurs at 316 and IVC occurs at 312.

Thus, it may be observed that the exhaust valve opening duration is longer than the intake valve opening duration. Further, IVO is near TDC and IVC is well advanced of BDC for rotating the engine in a forward direction. EVO is near BDC and EVC is near TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. For these reasons, air flow through the engine when the engine is rotated with an open intake throttle and unfueled in a reverse direction is greater than air flow through the engine when the engine is rotated with the intake throttle open and unfueled in a forward direction at a same engine speed. The increased air flow through the engine while the engine is rotated at a first speed in a reverse direction is due to the longer exhaust valve opening duration and exhaust valve opening and closing timings. The decreased air flow through the engine while the engine is rotated at the first speed in a forward direction is due to the shorter intake valve opening duration and intake valve opening and closing timings as compared to the exhaust valve opening duration and the exhaust valve opening and closing times. Thus, whether air flow through an engine while rotating the engine in a forward direction at a first speed is greater than air flow through the engine while rotating the engine in a reverse direction at the first speed depends on intake and exhaust valve timings, including valve opening durations and valve opening and closing times. Consequently, for some engine configurations, rotating an engine in a forward direction provides more air flow through the engine for a given engine speed as compared to rotating the same engine at the same given speed in a reverse direction. On the other hand, other engines that may provide more air flow through the engine at a given engine speed when rotated in a reverse direction as compared to rotating the same engine at the same speed in the forward direction. As such, the direction of engine rotation may be selected to increase air flow through the engine so that the engine may be rotated at a lower speed when diagnosing cylinder valve actuators. For example, if rotating a particular engine at a desired speed in a reverse direction provides greater air flow through the engine as compared to rotating the engine at the desired speed in the forward direction, then the engine may be rotated in a reverse direction for diagnosing cylinder valve actuators.

Referring now to FIG. 4A, a first configuration of engine 10 is shown. Engine 10 includes two cylinder banks 402 and 404. First cylinder bank 404 includes cylinders 410 numbered 1-4. Second cylinder bank 402 includes cylinders 410 numbered 5-8. Thus, the first configuration is a V8 engine comprising two cylinder banks. All cylinders operating may be a first cylinder operating mode. Front 405 of engine 10 includes an accessory drive 407, which may include pumps, fans, etc. Transmission 406 is shown coupled to a rear side of engine 10.

During select conditions, one or more of cylinders 410 may be deactivated via ceasing to flow fuel to the deactivated cylinders. Further, air flow to deactivated cylinders may cease via closing and holding closed intake and exhaust valves of the deactivated cylinders, thereby deactivating the intake and exhaust valves. The engine cylinders may be deactivated in a variety of patterns to provide a desired actual total number of activated or deactivated cylinders. For example, cylinders 2, 3, 5, and 8 may be deactivated forming a first pattern of deactivated cylinders and a second cylinder operating mode. Alternatively, cylinders 1, 4, 6, and 7 may be deactivated forming a second pattern of deactivated cylinders and a third cylinder operating mode. In still another example, cylinders 2 and 8 may be deactivated forming a third pattern of deactivated cylinders and a fourth cylinder operating mode. In yet another example, cylinders 3 and 5 may be deactivated forming a fourth pattern of deactivated cylinders and a fifth cylinder operating mode. In this example, five cylinder operating modes are provided; however, additional or fewer cylinder operating modes may be provided. If engine conditions are such that the engine may operate in any of the five cylinder modes described, the engine may be described as having five available cylinder operating modes. In this example, if two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

Referring now to FIG. 4B, a second configuration of engine 10 is shown. Engine 10 includes one cylinder bank 422. Cylinder bank 406 includes cylinders 410 numbered 1-4. Thus, the first configuration is an I4 engine comprising one cylinder bank. All cylinders operating may be a first cylinder operating mode for this engine configuration. Cylinder number one is nearest to front of engine 420.

Similar to the first configuration, one or more of cylinders 410 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2 and 3 may be deactivated forming a first pattern of deactivated cylinders and a second cylinder operating mode. Alternatively, cylinders 1 and 4 may be deactivated forming a second pattern of deactivated cylinders and a third cylinder operating mode. In still another example, cylinder 2 may be deactivated forming a third pattern of deactivated cylinders and a fourth cylinder operating mode. In yet another example, cylinder 3 may be deactivated forming a fourth pattern of deactivated cylinders and a fifth cylinder operating mode. In this example, if engine conditions are such that the engine may operate in any of the five cylinder modes described, the engine may be described as having five available cylinder operating modes. If two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

In still other examples, different cylinder configurations may be provided. For example, the engine may be a V6 engine or a V10 engine. The different engine configurations may also have different numbers of cylinder operating modes.

Referring now to FIG. 5, an example engine operating sequence for a V8 engine is shown. The operating sequence of FIG. 5 may be produced via the system of FIGS. 1 and 2 executing instructions of the method described in FIGS. 6A and 6B. Each plot shown in FIG. 5 occurs at the same time as the other plots in FIG. 5, and vertical markers T0-T9 indicate times of particular interest during the sequence. In this example, air flow through the engine while the engine is rotated unfueled in a reverse direction is greater than air flow through the engine if the engine is rotated unfueled in a forward direction when the engine is rotated at a same speed in the forward and reverse directions.

The first plot from the top of FIG. 5 represents valve mode versus time. The vertical axis represents valve mode. The horizontal axis represents time and time increases from the left side of FIG. 5 to the right side of FIG. 5. In this example, the engine is capable of operating in one of four valve modes at a point in time. The valve modes are indicated along the vertical axis and include V8 mode for operating the engine as an eight cylinder engine, V6A mode for operating the engine as a six cylinder engine using a first group of six cylinders, V6B mode for operating the engine as a six cylinder engine using a second group of six cylinders where the second group of six cylinders is different from the first group of six cylinders, and V4 mode for operating the engine as a four cylinder engine.

The second plot from the top of FIG. 5 represents an engine air flow amount or an amount of air flowing through the engine versus time. The vertical axis represents engine air flow and engine air flow increases in the direction of the vertical axis arrow. The horizontal axis represents time and time increases from the left hand side of FIG. 5 to the right hand side of FIG. 5.

The third plot from the top of FIG. 5 represents engine speed versus time. The vertical axis represents engine speed and engine speed increases in the direction of the vertical axis arrow. The horizontal axis represents time and time increases from the left hand side of FIG. 5 to the right hand side of FIG. 5.

The fourth plot from the top of FIG. 5 represents valve degradation state versus time. The vertical axis represents valve degradation state and an indication of valve degradation is provided when the valve degradation state trace is at a higher level near the vertical axis arrow. Valve degradation is not indicated when the valve degradation state trace is at a lower level near the horizontal axis. The horizontal axis represents time and time increases from the left hand side of FIG. 5 to the right hand side of FIG. 5.

The fifth plot from the top of FIG. 5 represents a valve diagnostic request state versus time. The vertical axis represents valve diagnostic state and a valve diagnostic is requested when the valve diagnostic state trace is at a higher level near the vertical axis arrow. A valve diagnostic is not requested when the valve diagnostic state trace is at a lower level near the horizontal axis. The horizontal axis represents time and time increases from the left hand side of FIG. 5 to the right hand side of FIG. 5.

At time T0, engine speed is zero and a valve diagnostic is not requested. The engine is engaged in V8 mode where all of its valve actuators are activated so that all cylinder valves are commended to operate (e.g., open and close during an engine cycle, two engine revolutions for a four stroke engine). Engine air flow is zero since the engine is not rotating and valve degradation is not indicated.

At time T1, the valve diagnostic state changes to a higher level to request engine cylinder valve diagnostics. The engine is rotated unfueled in a reverse direction in response to the request for engine cylinder valve diagnostics. The engine is rotated in reverse in this example because intake and exhaust valve timing allows greater air flow through the engine when the engine is rotated in a reverse direction for a given engine speed. Consequently, the engine may be rotated at a lower speed to achieve a desired engine air flow. The air flow through the engine begins to increase as engine rotation begins. The engine remains in eight cylinder mode and valve degradation is not asserted.

At time T2, the valve mode changes from V8 to V4 mode. Air flow to half the engine cylinders is prevented by entering V4 mode since half the engine valve actuators have deactivated half the engine cylinder valves in a closed state. The engine speed is at a desired constant speed and valve degradation is not asserted. The engine cylinder valve diagnostic request remains asserted.

Between time T2 and time T3, the engine air flow is decreased and it stabilizes to a value between upper threshold 502B and lower threshold 502A. Valve degradation may be indicated when engine air flow is greater than upper threshold 502B, and valve degradation may be indicated when engine air flow is less than lower threshold 502A when the engine is commanded to V4 mode. Engine air flow may be greater than upper threshold 502B if air is being pumped through one or more cylinders with intake and/or exhaust valves that are leaking or if cylinder intake/exhaust valves have not deactivated as commanded. Engine air flow may be less than lower threshold 502A if valves of more than the desired number of cylinder valves have been deactivated. In this instance, the engine air flow is between the upper and lower thresholds, so valve degradation is not indicated.

At time T3, the valve mode is switched back to V8 mode as the engine cylinder diagnostic continues on to diagnose V8 cylinder mode. The engine air flow increases in response to entering V8 mode since all engine cylinder valves begin to operate. The engine speed remains constant and valve degradation is not indicated. The valve diagnostic request remains asserted.

Between time T3 and time T4, the engine air flow is increased and it stabilizes to a value between upper threshold 501B and lower threshold 501A. Valve degradation may be indicated when engine air flow is less than lower threshold 501A when the engine is commanded to V8 mode. Engine air flow may be less than lower threshold 501A if cylinder valves have remained deactivated. In this instance, the engine air flow is above threshold 501A, so valve degradation is not indicated.

At time T4, the valve mode changes from V8 to a different V4 mode. In this instance four engine cylinders other than the engine cylinders of V4 mode between time T2 and time T3 are commanded deactivated. As such, air flow to half the engine cylinders is prevented by entering V4 mode since half the engine valve actuators have deactivated half the engine cylinder valves in a closed state. The engine speed is at a desired constant speed and valve degradation is not asserted. The engine cylinder valve diagnostic request remains asserted.

Between time T4 and time T5, the engine air flow is decreased and it stabilizes to a value between upper threshold 502B and lower threshold 502A. Again, valve degradation may be indicated when engine air flow is greater than upper threshold 502B, and valve degradation may be indicated when engine air flow is less than lower threshold 502A when the engine is commanded to V4 mode. Engine air flow may be greater than upper threshold 502B if air is being pumped through one or more cylinders with intake and/or exhaust valves that are leaking or if cylinder intake/exhaust valves have not deactivated as commanded. Engine air flow may be less than lower threshold 502A if valves of more than the desired number of cylinder valves have been deactivated. In this instance, the engine air flow is between the upper and lower thresholds, so valve degradation is not indicated.

At time T5, the valve mode is switched to V6A mode as the engine cylinder diagnostic continues on to diagnose a first V6 cylinder mode. The engine air flow increases in response to entering V6A mode since valves for two additional engine cylinders begin to operate. The engine speed remains constant and valve degradation is not indicated. The valve diagnostic request remains asserted.

Between time T5 and time T6, the engine air flow is decreased and it stabilizes to a value between upper threshold 506B and lower threshold 506A. Cylinder valve degradation may be indicated when engine air flow is greater than upper threshold 506B, and valve degradation may be indicated when engine air flow is less than lower threshold 506A when the engine is commanded to V6A mode. Engine air flow may be greater than upper threshold 506B if air is being pumped through one or more cylinders with intake and/or exhaust valves that are leaking or if cylinder intake/exhaust valves have not deactivated as commanded. Engine air flow may be less than lower threshold 506A if valves of more than the desired number of cylinder valves have been deactivated. In this instance, the engine air flow is between the upper and lower thresholds, so valve degradation is not indicated.

At time T6, the valve mode is switched to V6B mode, which operates different cylinder valves than V6A mode, as the engine cylinder diagnostic continues on to diagnose a second V6 cylinder mode. The engine air flow increases in response to entering V6B, but it should remain substantially constant since a V6A mode was just exited. The engine speed remains constant and valve degradation is not indicated. The valve diagnostic request remains asserted.

Between time T6 and time T7, the engine air flow is increased and it stabilizes to a value above upper threshold 506B. Cylinder valve degradation is now indicated because the engine air flow exceeds threshold 506B. One or more cylinder modes, such as V6B mode and V4 mode may be deactivated so that the engine may only enter V8 and V6A cylinder modes after valve degradation or valve actuator degradation is indicated. Cylinder valve degradation and cylinder valve actuator degradation may be synonymous since cylinder valve actuator degradation may be observable as cylinder valve degradation.

At time T7, the diagnostic completes and engine speed is reduced to zero. The engine air flow is reduced as engine speed is reduced and the engine is commanded back to V8 mode. Cylinder valve degradation remains asserted and the cylinder valve diagnostic is not requested.

In this way, an engine may be rotated unfueled in a reverse rotation to diagnose cylinder actuators. The engine may transition through various cylinder modes to determine if one or more cylinder valve actuators is degraded. If one or more cylinder valve actuators are degraded, the actual total number of cylinder modes may be reduced so that degraded cylinder valve actuators may not be requested to change operating state so that engine operation may be improved.

Figure 6A:
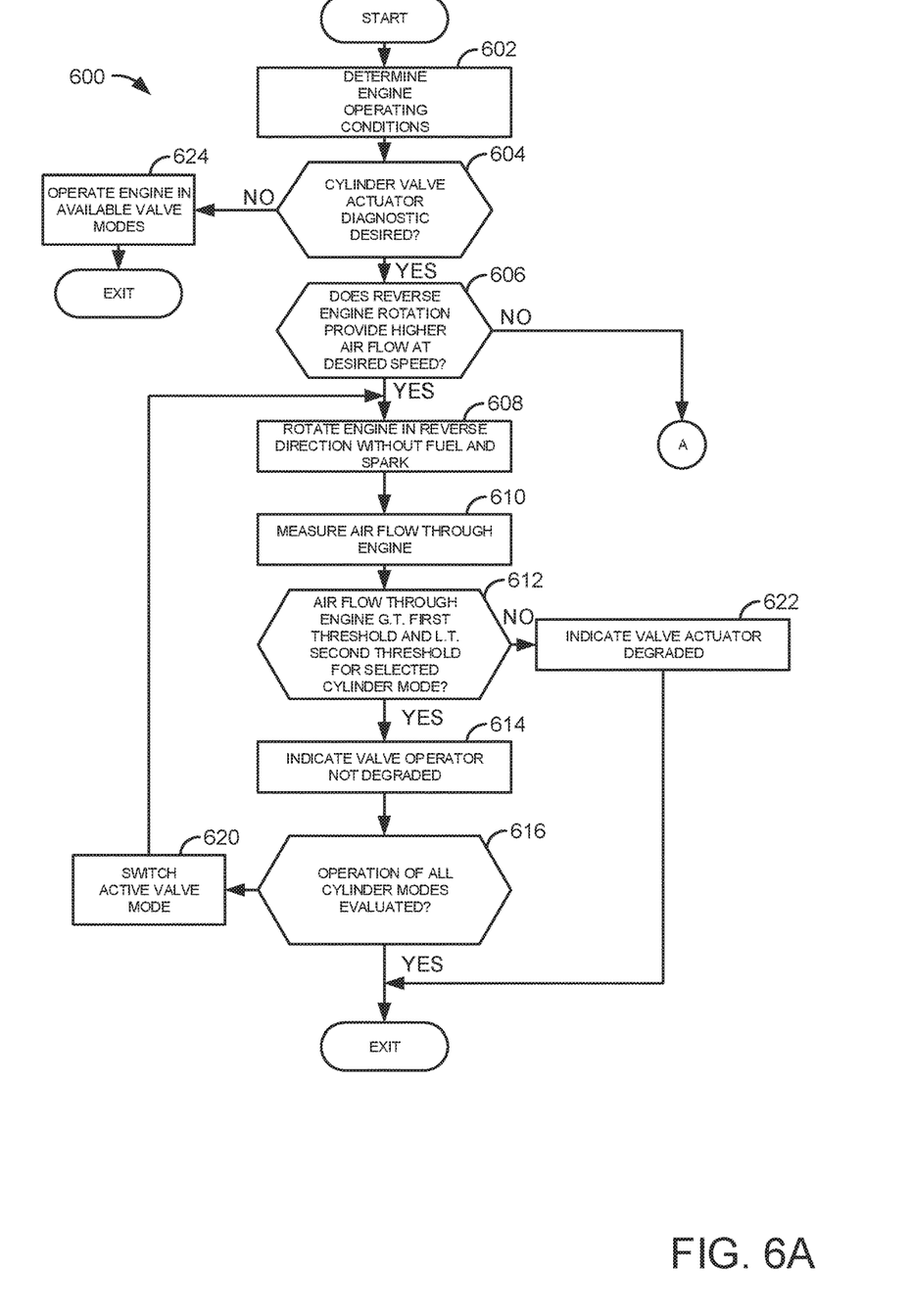
FIGS. 6A and 6B show an example method for operating an engine.
Figure 6B:
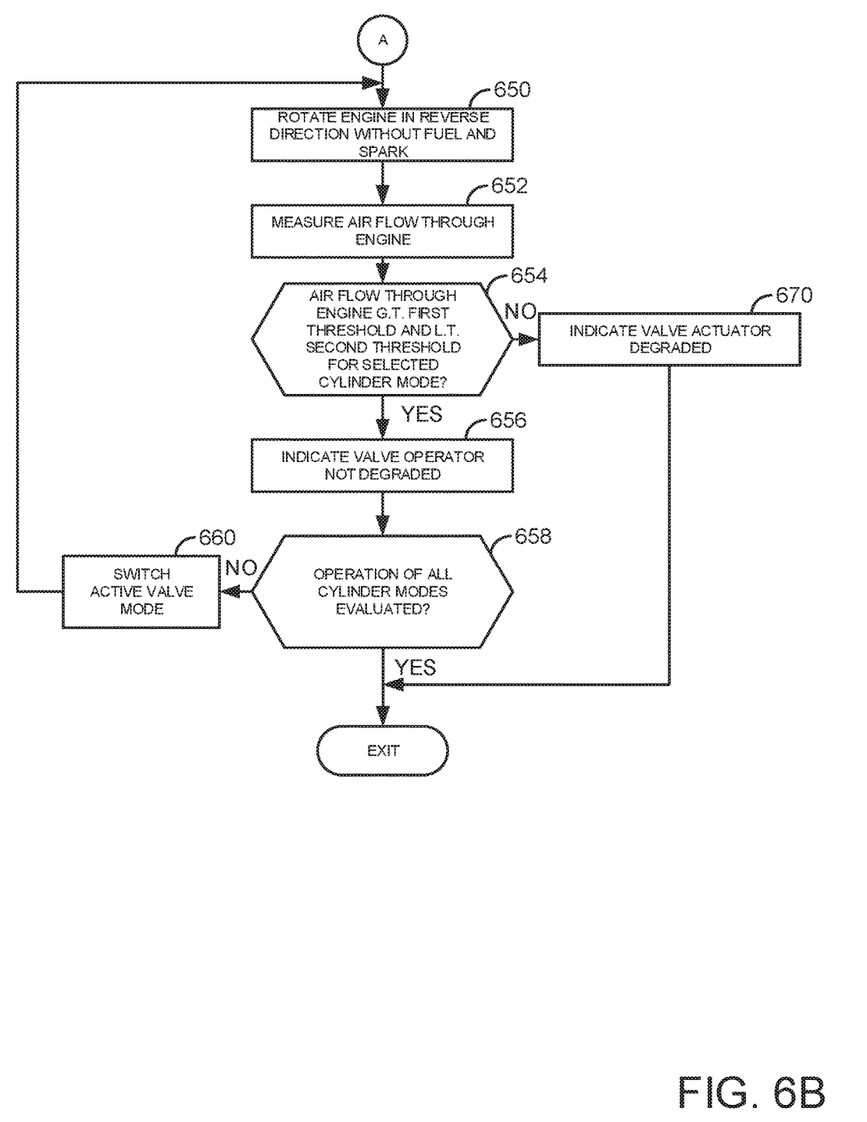

Referring now to FIGS. 6A and 6B, a method for determining valve actuator degradation via engine air flow is described. The method of FIGS. 6A and 6B may be incorporated into and may cooperate with the system of FIGS. 1 and 2. Further, at least portions of the method of FIGS. 6A and 6B may be incorporated as executable instructions stored in non-transitory memory while other portions of the method may be performed via a controller transforming operating states of devices and actuators in the physical world.

At 602, method 600 determines engine operating conditions. Engine operating conditions may include but are not limited to engine operating state, engine speed, engine load, engine temperature, vehicle speed, actual total number of cylinder mode changes since the vehicle was manufactured, and distance driven by the vehicle. Method 600 proceeds to 604 after engine operating conditions are determined.

At 604, method 600 judges whether or not cylinder valve actuator diagnostics are desired. In one example, cylinder valve actuator diagnostics may be desired after a vehicle travels a predetermined distance, after cylinder valves have been deactivated more than a threshold amount of times, and if vehicle operating conditions are desirable for cylinder valve actuator diagnostics. Cylinder valve actuator diagnostics may be desirable after vehicle passengers have exited a vehicle, if a vehicle is being remotely started, or if the vehicle is a hybrid vehicle and driver demand is low enough to cease engine operation. If method 600 judges that cylinder valve actuator diagnostics are desired, the answer is yes and method 600 proceeds to 606. Otherwise, the answer is no and method 600 proceeds to 624.

At 624, method 600 operates the engine in cylinder modes that have not been deactivated by cylinder valve actuator diagnostics. For example, if the engine is a V8 engine and it includes V6, V4, and V2 cylinder modes, all modes may be available and entered subject to driver demand torque and vehicle speed. However, if a valve actuator is diagnosed as degraded, the engine may be prevented from entering V2 and V4 cylinder modes. The particular cylinder mode that is activated depends on driver demand torque and engine or vehicle speed. Method 600 proceeds to exit.

At 606, method 600 judges if a greater amount of air will flow through the engine when the engine is rotated unfueled at a first speed in a forward direction, or if a greater amount of air will flow through the engine if the engine is rotated unfueled at the first speed in a reverse direction. Further, method 600 may make the judgement based on air flow through the engine with intake and exhaust cams positioned at their base positions (e.g., positions where the intake and exhaust cams are pinned and prohibited from moving relative to crankshaft position). If method 600 judges that engine air flow when the engine is rotating unfueled at a first engine speed and in a direction that is reversed from a direction the engine rotates when the engine is combusting air and fuel (e.g., reverse direction or counter clockwise) is greater than engine air flow when the engine is rotating unfueled at the first engine speed and in the direction the engine rotates when the engine is combusting air and fuel (e.g., forward direction or clockwise), the answer is yes and method 600 proceeds to 608. Otherwise, the answer is no and method 600 proceeds to 650.

At 608, method 600 does not supply spark and fuel to engine cylinders and rotates the engine in a reverse direction. In one example, the engine may be rotated in a reverse direction via a starter or an integrated starter/generator. The engine is rotated at a predetermined speed and the engine throttle is fully opened. By opening the throttle, effects of intake manifold filling may be reduced so that engine air flow may be more consistent. Method 600 initially begins the cylinder valve actuator diagnostic in a cylinder mode where all engine cylinder valves are commanded to open and close during an engine cycle. Method 600 proceeds to 610.

At 610, method 600 measures air flow through the engine via the engine air flow meter. The air meter outputs a voltage or current that is converted into an engine air flow amount. Method 600 proceeds to 612 after determining the engine air flow.

At 612, method 600 judges if air flow through the engine is greater than (G.T.) a first threshold and less than (L.T.) a second threshold. The values of the first and second threshold may be different for differed cylinder modes. If the engine is operating in a mode with all engine cylinders active, method 600 may judge only if air flow through the engine is less than the second threshold. If method 600 judges that air flow through the engine is greater than (G.T.) the first threshold and less than (L.T.) the second threshold, the answer is yes and method 600 proceeds to 614. Otherwise, the answer is no and method 600 proceeds to 622.

At 622, method 600 adjusts engine operation and indicates valve actuator degradation. Engine cylinder valve actuator degradation may be indicated by illuminating a light or notifying a vehicle occupant via an information center. Further, method 600 may adjust engine operation by preventing the engine from entering one or more cylinder modes (e.g., V8, V6, V4, etc.). By preventing the engine from entering a cylinder mode, the possibility of engine emissions degradation may be reduced. Further, wear of valve train components may be reduced. Method 600 proceeds to exit.

At 614, method 600 may indicate that cylinder valve actuators are not degraded. In one example, method 600 may not illuminate a light or expected engine operation may be indicated to vehicle occupants via an information center. Method 600 proceeds to 616.

At 616, method 600 judge if all cylinder modes have been evaluated for cylinder valve degradation. The cylinder modes may include but are not limited to V8 mode, V6 mode, V4 mode, V2 mode, I2 mode, I3 mode, and I4 mode. If method 600 judges that all cylinder modes have been evaluated for cylinder valve actuator degradation, the answer is yes and method 600 proceeds to exit. Otherwise, the answer is no and method 600 proceeds to 620.

At 620, method 600 commands the engine to operate cylinder valves of cylinder modes that have not been previously activated in the cylinder valve diagnostic procedure. For example, if the engine is a V8 engine and has only operated in V8 mode, V6 cylinder mode may be activated by activating intake and exhaust valves of six cylinders while deactivating valves of two cylinders (e.g., holding intake and exhaust valves closed for longer that two engine revolutions). In this way, all cylinder valve operating patterns and cylinder valve actuators may be assessed. Method 600 returns to 608 after activating a cylinder mode that has not been previously activated during the present cylinder valve diagnostic.

At 650, method 600 does not supply spark and fuel to engine cylinders and rotates the engine in a forward direction. In one example, the engine may be rotated in the forward direction via a starter or an integrated starter/generator. The engine is rotated at a predetermined speed and the engine throttle is fully opened. By opening the throttle, effects of intake manifold filling may be reduced so that engine air flow may be more consistent. Method 600 initially begins the cylinder valve actuator diagnostic in a cylinder mode where all engine cylinder valves are commanded to open and close during an engine cycle. Method 600 proceeds to 652.

At 652, method 600 measures air flow through the engine via the engine air flow meter. Method 600 proceeds to 654 after determining the engine air flow.

At 654, method 600 judges if air flow through the engine is greater than (G.T.) a first threshold and less than (L.T.) a second threshold. The values of the first and second threshold may be different for differed cylinder modes. If the engine is operating in a mode with all engine cylinders active, method 600 may judge only if air flow through the engine is less than the second threshold. If method 600 judges that air flow through the engine is greater than (G.T.) the first threshold and less than (L.T.) the second threshold, the answer is yes and method 600 proceeds to 656. Otherwise, the answer is no and method 600 proceeds to 670.

At 670, method 600 adjusts engine operation and indicates valve actuator degradation. Engine cylinder valve actuator degradation may be indicated by illuminating a light or notifying a vehicle occupant via an information center. Further, method 600 may adjust engine operation by preventing the engine from entering one or more cylinder modes (e.g., V8, V6, V4, etc.). By preventing the engine from entering a cylinder mode, the possibility of engine emissions degradation may be reduced. Further, wear of valve train components may be reduced. Method 600 proceeds to exit.

At 656, method 600 may indicate that cylinder valve actuators are not degraded. In one example, method 600 may not illuminate a light or expected engine operation may be indicated to vehicle occupants via an information center. Method 600 proceeds to 658.

At 658, method 600 judge if all cylinder modes have been evaluated for cylinder valve degradation. The cylinder modes may include but are not limited to V8 mode, V6 mode, V4 mode, V2 mode, I2 mode, I3 mode, and I4 mode. If method 600 judges that all cylinder modes have been evaluated for cylinder valve actuator degradation, the answer is yes and method 600 proceeds to exit. Otherwise, the answer is no and method 600 proceeds to 660.

At 660, method 600 commands the engine to operate cylinder valves of cylinder modes that have not been previously activated in the cylinder valve diagnostic procedure. For example, if the engine is a V8 engine and has only operated in V8 mode, V6 cylinder mode may be activated by activating intake and exhaust valves of six cylinders while deactivating valves of two cylinders (e.g., holding intake and exhaust valves closed for longer that two engine revolutions). In this way, all cylinder valve operating patterns and cylinder valve actuators may be assessed. Method 600 returns to 650 after activating a cylinder mode that has not been previously activated during the present cylinder valve diagnostic.

Thus, the method of FIGS. 6A and 6B provides for an engine operating method, comprising: rotating an engine without combusting air and fuel in a direction reversed from a direction the engine rotates while combusting air and fuel via a controller; and adjusting operation of the engine in response to engine air flow less than a first threshold or greater than a second threshold while deactivating valves of one or more engine cylinders. The method includes where adjusting engine operation includes deactivating one or more cylinder modes. The method includes where adjusting engine operation includes activating all cylinders of the engine. The method further comprises determining engine air flow via an air flow meter while rotating the engine in the direction reversed from a direction the engine rotates while combusting air and fuel. The method includes where the direction the engine rotates while combusting air and fuel is clockwise when the engine is observed from a front side. The method includes where the engine is rotated via a starter or an integrated starter/generator. The method includes where deactivating valves of one or more engine cylinders includes holding valves in a closed state over two consecutive engine revolutions.

The method of FIGS. 6A and 6B also provides for an engine operating method, comprising: rotating an engine in a direction responsive to a rotational direction of the engine that provides greater air flow through the engine at a predetermined engine speed, the engine with valves at a base valve timing. The method further comprises deactivating valves of one or more cylinders of the engine while rotating the engine in the direction. The method includes where the direction is counter clockwise. The method includes where the direction is clockwise. The method includes where the engine is rotated without combusting air and fuel. The method further comprises adjusting engine operation in response to engine air flow being less than a first threshold or being greater than a second threshold. The method includes where adjusting engine operation includes deactivating one or more cylinder modes.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   rotating an engine without combusting air and fuel in a direction reversed from a direction the engine rotates while combusting air and fuel via a controller; and
   adjusting operation of the engine in response to engine air flow less than a first threshold or greater than a second threshold while deactivating valves of one or more engine cylinders.

2. The method of claim 1, where adjusting engine operation includes deactivating one or more cylinder modes.

3. The method of claim 1, where adjusting engine operation includes activating all cylinders of the engine.

4. The method of claim 1, further comprising determining engine air flow via an air flow meter while rotating the engine in the direction reversed from a direction the engine rotates while combusting air and fuel.

5. The method of claim 1, where the direction the engine rotates while combusting air and fuel is clockwise when the engine is observed from a front side.

6. The method of claim 1, where the engine is rotated via a starter or an integrated starter/generator.

7. The method of claim 1, where deactivating valves of one or more engine cylinders includes holding valves in a closed state over two consecutive engine revolutions.

8. An engine operating method, comprising:
   rotating an engine in a direction responsive to a rotational direction of the engine that provides greater air flow through the engine at a predetermined engine speed, the engine with valves at a base valve timing.

9. The method of claim 8, further comprising deactivating valves of one or more cylinders of the engine while rotating the engine in the direction.

10. The method of claim 8, where the direction is counter clockwise.

11. The method of claim 8, where the direction is clockwise.

12. The method of claim 8, where the engine is rotated without combusting air and fuel.

13. The method of claim 12, further comprising adjusting engine operation in response to engine air flow being less than a first threshold or being greater than a second threshold.

14. The method of claim 13, where adjusting engine operation includes deactivating one or more cylinder modes.

15. An engine system, comprising:
an engine including one or more cylinder valve deactivating mechanisms; an electric machine; and
a controller including executable instructions stored in non-transitory memory to rotate the engine clockwise and counter clockwise, the engine rotated clockwise when the engine combusts air and fuel, the engine rotating counter clockwise when the engine is not combusting air and fuel and while one or more of the cylinder valve deactivating mechanisms is deactivating one or more cylinder valves.

16. The engine system of claim 15, where the electric machine is a starter motor.

17. The engine system of claim 15, where the electric machine is an integrated starter/generator.

18. The engine system of claim 15, further comprising additional instructions to determine air flow through the engine via an air flow meter while the engine is rotating counter clockwise.

19. The engine system of claim 18, further comprising additional instructions to deactivate one or more cylinder modes in response to output of the air flow meter.

20. The engine system of claim 15, where deactivating one or more cylinder valves comprises holding one or more cylinder valves in a closed state for at least two consecutive engine revolutions.

* * * * *